United States Patent
Saquib et al.

(10) Patent No.: US 9,742,648 B2
(45) Date of Patent: Aug. 22, 2017

(54) EFFICIENT TOPOLOGY FAILURE DETECTION IN SDN NETWORKS

(71) Applicant: Brocade Communications Systems, Inc., San Jose, CA (US)

(72) Inventors: Sayed Mohd Saquib, Karnataka (IN); Eswara Chinthalapati, San Jose, CA (US); Dilip Kumar, Royal Oak, MI (US)

(73) Assignee: Brocade Communications Systems, Inc., San Jose, CA (US)

( * ) Notice: Subject to any disclaimer, the term of this patent is extended or adjusted under 35 U.S.C. 154(b) by 46 days.

(21) Appl. No.: 14/923,738

(22) Filed: Oct. 27, 2015

(65) Prior Publication Data

US 2016/0285750 A1    Sep. 29, 2016

Related U.S. Application Data

(60) Provisional application No. 62/136,922, filed on Mar. 23, 2015.

(51) Int. Cl.
*H04L 12/26* (2006.01)
*H04L 12/24* (2006.01)
(Continued)

(52) U.S. Cl.
CPC ...... *H04L 43/0894* (2013.01); *H04L 41/0677* (2013.01); *H04L 43/026* (2013.01);
(Continued)

(58) Field of Classification Search
None
See application file for complete search history.

(56) References Cited

U.S. PATENT DOCUMENTS 7,292,535 B2    11/2007   Folkes et al.
7,519,056 B2     4/2009   Ishwar et al.
(Continued)

FOREIGN PATENT DOCUMENTS

CN      103782552 A     5/2014
WO    2014139564 A1    9/2014
(Continued)

OTHER PUBLICATIONS

U.S. Appl. No. 61/832,655, filed Jun. 7, 2013 by Jogalekar et al.
(Continued)

*Primary Examiner* — Otis L Thompson, Jr.
(74) *Attorney, Agent, or Firm* — Fountainhead Law Group P.C.

(57) ABSTRACT

Techniques for performing efficient topology failure detection in SDN networks are provided. In one embodiment, a computer system (e.g., an SDN controller) can transmit a first message to a first network device, where the first message instructs the first network device to begin sending probe packets to a second network device at a predetermined rate. The computer system can further transmit a second message to the second network device, where the second message instructs the second network device to monitor for the probe packets sent by the first network device and to notify the computer system when one or more of the probe packets are not received by the second network device. If the computer system receives such a notification from the second network device, the computer system can determine that a port, link, or node failure has occurred between the first and second network devices.

20 Claims, 8 Drawing Sheets

(51) Int. Cl.
*H04L 12/721* (2013.01)
*H04L 12/715* (2013.01)
*H04L 12/707* (2013.01)
*H04L 12/703* (2013.01)

(52) U.S. Cl.
CPC ...... *H04L 43/0811* (2013.01); *H04L 43/0829* (2013.01); *H04L 43/0835* (2013.01); *H04L 43/10* (2013.01); *H04L 43/12* (2013.01); *H04L 45/22* (2013.01); *H04L 45/28* (2013.01); *H04L 45/38* (2013.01); *H04L 45/64* (2013.01); *Y02B 60/43* (2013.01)

(56) References Cited

U.S. PATENT DOCUMENTS

| | | | |
|---|---|---|---|
| 8,559,314 | B2 | 10/2013 | Yedavalli et al. |
| 8,593,958 | B2 | 11/2013 | Zhang |
| 8,644,149 | B2 | 2/2014 | Yedavalli |
| 8,787,154 | B1 | 7/2014 | Medved et al. |
| 8,830,820 | B2 | 9/2014 | Mandal et al. |
| 8,937,961 | B1 | 1/2015 | Vairavakkalai |
| 8,995,272 | B2 | 3/2015 | Agarwal et al. |
| 9,038,151 | B1* | 5/2015 | Chua ............ H04L 45/02 709/223 |
| 9,124,506 | B2 | 9/2015 | Jogalekar et al. |
| 9,191,139 | B1 | 11/2015 | Venkata et al. |
| 9,444,842 | B2 | 9/2016 | Porras et al. |
| 9,450,817 | B1 | 9/2016 | Bahadur et al. |
| 9,450,823 | B2 | 9/2016 | Arora et al. |
| 9,467,536 | B1 | 10/2016 | Kanekar et al. |
| 9,705,783 | B2 | 7/2017 | Jogalekar et al. |
| 2003/0218982 | A1 | 11/2003 | Folkes et al. |
| 2007/0011685 | A1 | 1/2007 | Yim et al. |
| 2007/0153683 | A1* | 7/2007 | McAlpine ........ H04L 12/2602 370/229 |
| 2011/0145390 | A1 | 6/2011 | Kakadia et al. |
| 2012/0131222 | A1 | 5/2012 | Curtis et al. |
| 2013/0010600 | A1 | 1/2013 | Jocha et al. |
| 2013/0064079 | A1 | 3/2013 | Zhang |
| 2013/0094350 | A1 | 4/2013 | Mandal et al. |
| 2013/0124707 | A1 | 5/2013 | Ananthapadmanabha et al. |
| 2013/0311675 | A1 | 11/2013 | Kancherla |
| 2013/0318243 | A1 | 11/2013 | Chinthalapati et al. |
| 2014/0075519 | A1 | 3/2014 | Porras et al. |
| 2014/0149542 | A1 | 5/2014 | Luo et al. |
| 2014/0173018 | A1 | 6/2014 | Westphal et al. |
| 2014/0280817 | A1 | 9/2014 | Uppalapati et al. |
| 2014/0280893 | A1 | 9/2014 | Pfeifer et al. |
| 2015/0043382 | A1 | 2/2015 | Arora et al. |
| 2015/0071108 | A1 | 3/2015 | Lumezanu et al. |
| 2015/0103642 | A1* | 4/2015 | Stuart ............ H04L 41/0631 370/218 |
| 2015/0195162 | A1* | 7/2015 | Gandham ........ H04L 41/04 709/206 |
| 2015/0215156 | A1* | 7/2015 | Yoon ............... H04L 45/64 370/225 |
| 2015/0256397 | A1* | 9/2015 | Agarwal .......... H04L 41/12 370/254 |
| 2015/0304158 | A1* | 10/2015 | Dharmadhikari ..... H04L 41/046 714/37 |
| 2015/0319190 | A1* | 11/2015 | Kruglick ......... H04L 45/02 726/11 |
| 2015/0334002 | A1 | 11/2015 | Jogalekar et al. |
| 2015/0350077 | A1 | 12/2015 | Durrani et al. |
| 2015/0358338 | A1 | 12/2015 | Zeitlin et al. |
| 2016/0043941 | A1 | 2/2016 | D'Heureuse et al. |
| 2016/0156550 | A1* | 6/2016 | Song ............... H04L 12/44 370/256 |
| 2016/0182336 | A1 | 6/2016 | Doctor et al. |
| 2016/0205071 | A1 | 7/2016 | Cooper et al. |
| 2016/0226701 | A1* | 8/2016 | Luo ............... H04L 45/02 |
| 2016/0226742 | A1* | 8/2016 | Apathotharanan ..... H04L 43/12 |
| 2016/0285729 | A1 | 9/2016 | Chinthalapati et al. |
| 2016/0294731 | A1 | 10/2016 | McDaniel et al. |
| 2016/0344621 | A1* | 11/2016 | Roeland ........... H04W 28/00 |
| 2017/0013049 | A1 | 1/2017 | Patil |
| 2017/0041209 | A1* | 2/2017 | Joshi ............. H04L 43/106 |
| 2017/0048312 | A1 | 2/2017 | Moyer |
| 2017/0104622 | A1* | 4/2017 | Sawal ............ H04L 41/046 |

FOREIGN PATENT DOCUMENTS

| | | | |
|---|---|---|---|
| WO | 2015032027 | A1 | 3/2015 |
| WO | 2016153713 | A1 | 9/2016 |

OTHER PUBLICATIONS

U.S. Appl. No. 62/089,028, filed Dec. 8, 2014 by Durrani et al.
U.S. Appl. No. 62/005,177, filed May 30, 2014 by Durrani et al.
U.S. Appl. No. 62/141,672, filed Apr. 1, 2015 by Sreenivasa et al.
U.S. Appl. No. 62/191,073, filed Jul. 10, 2015 by Patil.
U.S. Appl. No. 62/204,388, filed Aug. 12, 2015 by Moyer.
U.S. Appl. No. 62/247,904, filed Oct. 29, 2015 by Moyer et al.
U.S. Appl. No. 62/136,922, filed Mar. 23, 2015 by Saquib et al.
U.S. Appl. No. 14/805,901, filed Jul. 22, 2015 by Jogalekar et al.
U.S. Appl. No. 14/721,978, filed May 26, 2015 by Durrani et al.
U.S. Appl. No. 14/874,055, filed Oct. 2, 2015 by McDaniel et al.
U.S. Appl. No. 14/848,035, filed Sep. 8, 2015 by Patil.
U.S. Appl. No. 14/918,441, filed Oct. 20, 2015 by Moyer.
U.S. Appl. No. 14/923,769, filed Oct. 27, 2015 by Chinthalapati et al.
Hommes: "Fault Detection and Network Security in Software-Defined Networks with Openflow"; PhD Dissertation; PhD-FSTC-2014-06; The Faculty of Sciences, Technology and Communication; Mar. 25, 2014; 130 pages.
http://www.juniper.net/documentation/en_US/junos14.2/topics/example/cos-based-forwarding-example-cos-config-guide.html; 3 pages.
http://www.cisco.com/c/en/us/td/docs/ios/12_0s/feature/guide/gscbts.html; 56 pages.
http://blog.hoff.geek.nz/tag/cos-based-forwarding/; 16 pages.
Adrichem et al.: "Fast Recovery in Software-Defined Networks", EWSDN, 2014, 6 pages.
Kempf et al.: "Scalable Fault Management for OpenFlow", ICC, IEEE 2012, 5 pages.
Tilmans: "Robust fault-recovery in Software-Defined Networks", Ecole Polytechnique de Louvain, Masters Thesis, 2013-2014, 104 pages.
PCT Patent Application No. PCT/US16/19510 filed on Feb. 25, 2016 by Eswara Chinthalapati et al.
International Search Report & Written Opinion for PCT Application PCT/US16/19510 mailed May 25, 2016, 13 pages.
OpenFlow Switch Specification, Version 1.5.0, Open Networking Foundation, Dec. 19, 2014, 277 pages.
Akyildiz et al.: "A roadmap for traffic engineering in SDN-Openflow networks", Computer Networks, vol. 71, Jun. 19, 2014, 30 pages.
NonFinal Office Action Dated Nov. 18, 2016; U.S. Appl. No. 14/805,901; (9 pgs.)
Soeurt et al, Shortest path forwarding using OpenFlow, University of Amsterdam, 58 pages, Feb. 2012.
Egilmez et al., OpenQoS: An OpenFlow Controller Design for Multimedia Delivery With End-to-End Quality of Service Over Software-Defined Networks, IEEE, 8 pages, 2012.
Extended EP Search Report for EP Appln. No. 16001306.6 dated Dec. 6, 2016, 10 pages.
NonFinal Office Action Dated Mar. 24, 2017; U.S. Appl. No. 14/721,978; (31 pgs.).
Zartash Afzal Uzmi, Markus Nebel, Ahsan Tariq, Sana Jawad, Ruichuan Chen, Aman Shaikh, Jia Wang, and Paul Francis, "SMALTA: Practical and Near-Optimal FIB Aggregation," Pulished in: Proceedings of the Seventh Conference on emerging Networking Experiments and Technologies. Tokyo, Japan, Dec. 6-9, 2011. Article No. 29, 12 pages.
Christian E. Rothenberg, Marcelo R. Nascimento, Marcos R. Salvador, Carlos N.A. Correa, Sidney c. de Lucena, and Robert Raszuk,

(56) References Cited

OTHER PUBLICATIONS

"Revising Routing Control Platforms with the Eyes and Muscles of Software-Defined Networking." HotSDN'12, Aug. 13, 2012, Helsinki, Finland. pp. 13-28.

Marcelo Ribeiro Nascimento, Christian Esteve Rothenberg, Marcos Rogerio Salvador and Mauricio Ferreira Magalhaesy, "QuagFlow: Partnering Quagga with OpenFlow", SIGCOMM'10, Aug. 30-Sep. 3, 2010, New Delhi, India, 2 pages.

Paul Zimmerman, "OpenDaylight Controller: Binding-Independent Components", Mar. 23, 2013, 16 printed pages. Available online: https://wiki.opendaylight.org/index.php?title=OpenDaylight_Controller:Binding-Independent_Components&oldid=331.

Paul Zimmerman, "OpenDaylight Controller: Binding Aware Components", Mar. 23, 2013, 10 printed pages. Available online: https://wiki.opendaylight.org/index.php?title=OpenDaylight_Controller:Binding_Aware_Components&oldid=339.

Ivan Pepelnjak, "Hybrid OpenFlow, the Brocade Way", Jun. 19, 2012, 3 printed pages. Available online: http://web.archive.org/web/20130514054903/http://blog.ioshints.info/2012/06/hybrid-openflow-brocade-way.html.

Notice of Allowance Dated Mar. 29, 2017; U.S. Appl. No. 14/805,901; (16 pgs.).

NonFinal Office Action dated Apr. 21, 2017; U.S. Appl. No. 14/923,769; (58 pgs.).

NonFinal Office Action Dated Jun. 5, 2017; U.S. Appl. No. 14/874,055; (45 pgs.).

Port Mirroring with Linux Bridges; Waldner; Jun. 17, 2014.

\* cited by examiner

EFFICIENT TOPOLOGY FAILURE DETECTION IN SDN NETWORKS

CROSS-REFERENCES TO RELATED APPLICATIONS

The present application claims the benefit and priority under U.S.C. 119(e) of U.S. Provisional Application No. 62/136,922, filed Mar. 23, 2015, entitled "INCREASING RESILIENCY IN SDN NETWORKS." The entire contents of this provisional application are incorporated herein by reference for all purposes.

In addition, the present application is related to commonly-owned U.S. patent application Ser. No. 14/923,769, filed concurrently with the present application, entitled "FLOW-SPECIFIC FAILURE DETECTION IN SDN NETWORKS." The entire contents of this related application are incorporated herein by reference for all purposes.

BACKGROUND

As known in the art, Software Defined Networking (SDN) is a computer networking paradigm in which the system(s) that make decisions about where traffic is sent (i.e., the control plane) are decoupled from the system(s) that forward traffic to their intended destinations (i.e., the data plane). By way of example, FIG. 1A depicts a simplified representation of an SDN network 100 comprising an SDN controller 102 and three network switches 104, 106, 108. In this example, SDN controller 102 constitutes the control plane of network 100 and is responsible for, e.g.: (1) maintaining a global view of network 100; (2) determining (via one or more applications running on, or in communication with, controller 102) forwarding rules to be followed by switches 104-108 in order to achieve a desired network behavior; and (3) causing those rules to be programmed into the hardware forwarding tables of switches 104-108. Switches 104-108 constitute the data plane of network 100 and are responsible for, e.g., forwarding, at line rate, network traffic in accordance with the forwarding rules determined by SDN controller 102.

In current SDN networks, the detection of network faults is handled centrally by the SDN controller via Link Layer Discovery Protocol (LLDP). An example of a conventional fault detection method 150 that can be performed by SDN controller 102 of FIG. 1A using LLDP is depicted in FIG. 1B. At step (1) (reference numeral 152), SDN controller 102 constructs and sends out an LLDP packet with a "packet_out" message to each connected switch. SDN controller 102 typically performs this step every second.

At step (2) (reference numeral 154), each switch (104, 106, 108) receives the LLDP packet sent by SDN controller 102 and forwards the packet on all of its outgoing ports (to other switches in the network).

Finally, at step (3) (reference numeral 156), each switch (104, 106, 108) receives the LLDP packets forwarded by other switches and sends those packets back to SDN controller 102. If there are no topology failures in the network, SDN controller 102 should receive these return packets approximately every second (i.e., at the same rate that the packets were sent out at step (1)). If SDN controller 102 does not receive a return packet from a particular switch within a predefined LLDP timeout period (e.g., 3 seconds), SDN controller 102 can conclude that one or more ports or links along the path from that switch have failed.

While the fault detection method shown in FIG. 1B is functional, it suffers from a number of limitations. First, since method 150 requires that SDN controller 102 send out LLDP packets on a continuous basis to switches 104-108 and monitor for the receipt of those packets before determining whether a fault has occurred, method 150 cannot easily scale to support a very large network or to support faster detection times. For instance, if SDN controller 102 increased the rate at which it sent out LLDP packets in order to improve detection times, SDN controller 102 would also need to be able to process the incoming return packets at that higher rate, which may not be possible. Similarly, if network 100 increased in size to encompass more switches, SDN controller 102 would need to be able to handle the greater volume of outgoing and incoming LLDP traffic caused by the additional switches.

Second, since SDN controller 102 acts as the point-of-detection, SDN controller 102 must communicate with the affected switch(es) upon detecting a fault into order to initiate a repair (e.g., provisioning and switch-over to a backup path). This extra communication step can slow down the overall repair process.

Third, method 150 of FIG. 1B can only be used to detect faults that affect the integrity of a network topology, such as port, link, or node failures. Method 150 cannot detect flow-specific failures that do not affect the network topology, but may nevertheless result in unexpected forwarding behavior (e.g., a mis-programmed flow or incorrect flow priorities).

SUMMARY

Techniques for performing efficient topology failure detection in SDN networks are provided. In one embodiment, a computer system (e.g., an SDN controller) can transmit a first message to a first network device, where the first message instructs the first network device to begin sending probe packets to a second network device at a predetermined rate. The computer system can further transmit a second message to the second network device, where the second message instructs the second network device to monitor for the probe packets sent by the first network device and to notify the computer system when one or more of the probe packets are not received by the second network device. If the computer system receives such a notification from the second network device, the computer system can determine that that a port, link, or node failure has occurred between the first and second network devices.

The following detailed description and accompanying drawings provide a better understanding of the nature and advantages of particular embodiments.

DETAILED DESCRIPTION

Figure 1A:
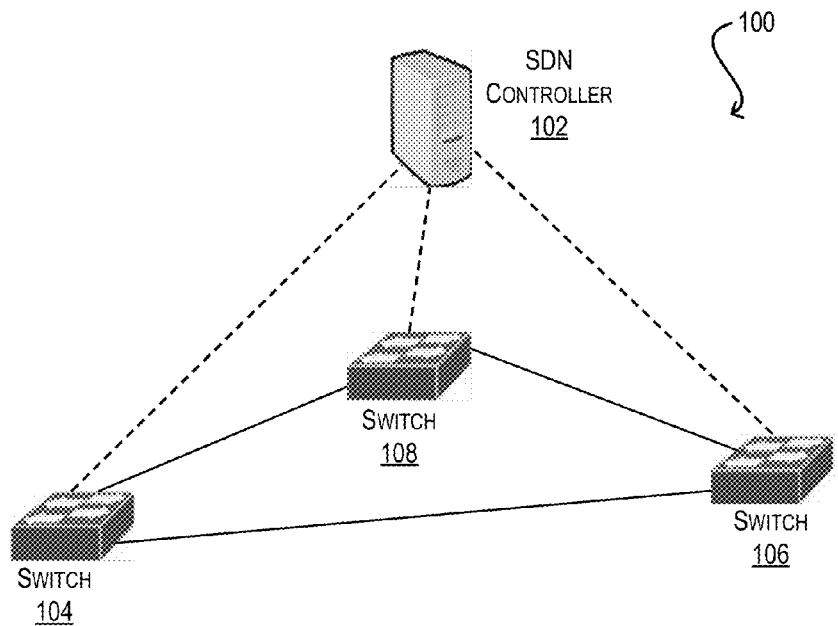
FIG. 1A depicts an example SDN network.
Figure 1B:
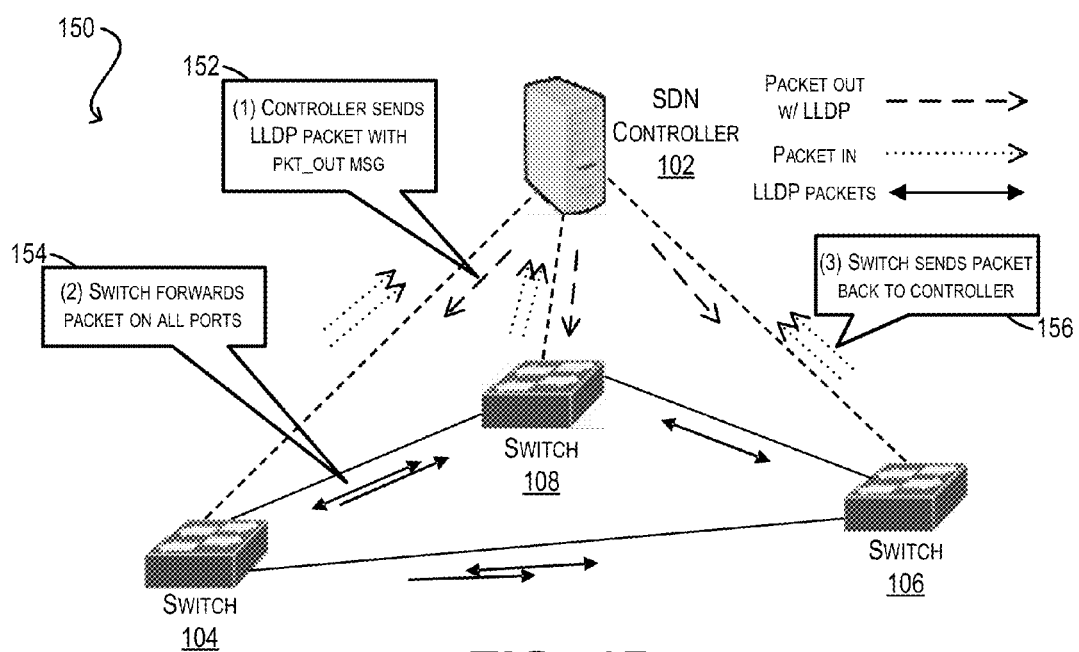
FIG. 1B depicts an example LLDP workflow within the SDN network of FIG. 1A.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for improving the resiliency of SDN networks against various types of network faults. In one set of embodiments, these techniques include an improved fault detection method (referred to as "active path tracing") in which an SDN controller instructs first and second switches at the endpoints of a link/path to respectively transmit, and monitor for, probe packets along the link/path. If the second switch determines that it has not received a probe packet from the first switch within a predetermined timeout period (or has not received a predetermined number of consecutive probe packets), the second switch can transmit a notification to the SDN controller indicating that the link or ports between the two switches have failed. With this approach, there is no need for the SDN controller itself to send out probe (e.g., LLDP) packets and monitor for the return of those packets in order to detect faults; instead, the controller can effectively offload these tasks to the switches in the network. As a result, the amount of control traffic exchanged between the SDN controller and the switches can be significantly reduced when compared to traditional LLDP fault detection, which in turn can allow for greater efficiency/scalability and faster detection times.

In another set of embodiments, the techniques described herein include a method for detecting flow-specific failures. In these embodiments, the SDN controller can instruct a first switch involved in a unidirectional flow (e.g., a downstream switch) to keep track of its local flow data rate and to communicate this flow rate information to a second switch involved in the flow (e.g., an upstream switch) via special packets. If the upstream switch determines that its local flow data rate is not consistent with the data rate information received from the downstream switch, the upstream switch can transmit a message to the SDN controller indicating that there is a flow disruption. Thus, this method can detect "soft" failures where there is no change to the network topology, but there are nevertheless flow problems due to, e.g., system issues (packet forwarding from ingress to egress port), mis-programmed flows, and the like.

In yet another set of embodiments, the techniques described herein can include methods for reducing the time needed to repair a detected fault (either a topology failure or a flow-specific failure). At a high level, this can involve pre-provisioning, at the SDN controller, backup paths for switches in the network and transmitting this backup path information to the switches prior to the detection of any fault. For example, this backup path information can be sent as part of the instructions transmitted by the SDN controller for initiating active path tracing or flow data rate monitoring as described above. If a particular switch determines that there is a topology or flow-specific failure, that switch can immediately failover to the backup path provided by the SDN controller (referred to as a "local repair"), without having to communicate again with the SDN controller. It should be noted that this local repair is performed on a per-switch basis; in other words, each switch (with the exception of the last hop) can have a backup path pre-provisioned by the SDN controller. Upon detecting a topology or flow-specific failure, the switch can automatically failover to the pre-provisioned backup path.

These and other aspects of the present disclosure are described in further detail in the sections that follow.

2. System Environment

Figure 2:
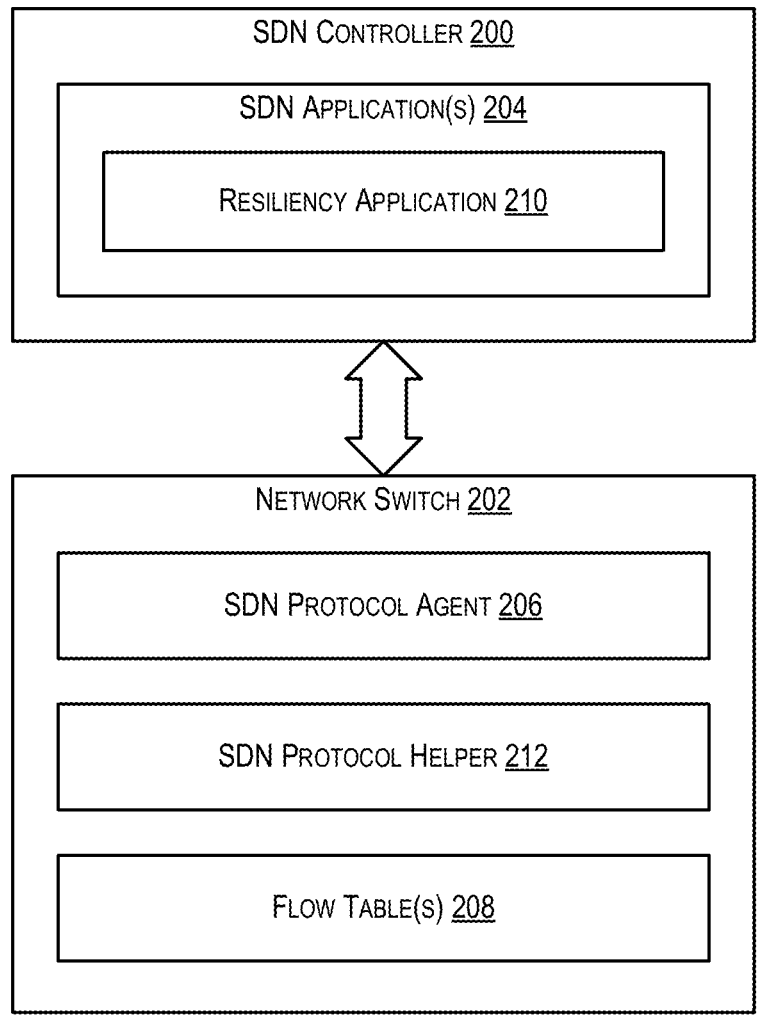
FIG. 2 depicts an SDN network that supports active path tracing and flow-specific failure detection according to an embodiment.

FIG. 2 depicts architectural components of an SDN controller 200 and a network switch 202 that support the resiliency features described herein according to an embodiment. SDN controller 200 can be implemented using, e.g., a general purpose or specialized computer system. Network switch 202 can be a physical (i.e., hardware-based) or virtual (i.e., software-based) switch.

As shown in FIG. 2, SDN controller 200 executes one or more SDN applications 204 that are configured to determine forwarding rules to be followed by network switch 202 according to the applications' respective requirements. SDN controller 200 can transmit the application-determined forwarding rules, via an appropriate southbound SDN protocol, to a SDN protocol agent 206 running on network switch 202. SDN protocol agent 206 can then program the forwarding rules into one or more of the switch's flow tables (e.g., tables 208).

In one embodiment, the southbound SDN protocol used for communication between SDN controller 200 and agent SDN protocol agent 206 can be the OpenFlow protocol. In other embodiments, the southbound SDN protocol can be any other standard or proprietary protocol known in the art.

As noted in the Background section, one deficiency with existing SDN network implementations is that they perform network fault detection using an LLDP flooding/timeout mechanism that requires the SDN controller to send out, and monitor for, LLDP packets—in other words, the SDN controller is the point-of-detection. This means that the processing capabilities of the SDN controller act as a limit on the scalability of the solution. Further, LLDP-based fault detection can only detect topology failures, and cannot detect flow-specific failures.

To address these and other similar issues, SDN controller 200 and network switch 202 of FIG. 2 implement a novel resiliency application 210 (as part of SDN applications 204) and a novel SDN protocol helper component 212 respectively. As described in further detail below, resiliency application 210 and SDN protocol helper 212 can interoperate in a manner that: (1) enables SDN controller 200 to offload the transmission and monitoring of fault detection probe packets to network switches like switch 202 (referred to herein as "active path tracing"); and (2) enables switch 202 and other similar switches to locally detect flow-specific failures via a flow statistics monitoring mechanism. Features (1) and (2) can be enabled without implementing any additional protocols beyond the SDN communication protocol already in use between SDN controller 200 and network switch 202. These features do not entirely replace LLDP (which may still be used for topology building at the SDN controller), but instead offload the fault detection function of LLDP to the switches, thereby providing faster detection, scalability, and ability to detect other kinds of failures that cannot be detected with LLDP (e.g., flow-specific failures).

Further, since features (1) and (2) above effectively make network switch 202 (rather than SDN controller 200) the point-of-detection for faults, in certain embodiments components 210 and 212 can work in concert to achieve local repair at switch 202 (i.e., failover of data traffic to a backup path in the case of a fault). This can significantly improve failover times, because there is no need for a roundtrip communication between network switch 202 and SDN controller 200 before initiating the repair process.

It should be appreciated that FIG. 2 is illustrative and not intended to limit embodiments of the present invention. For example, the various components/modules shown in FIG. 2 may have sub-components or functions that are not specifically described. One of ordinary skill in the art will recognize other modifications, variations, and alternatives.

3. Active Path Tracing

Figure 3:
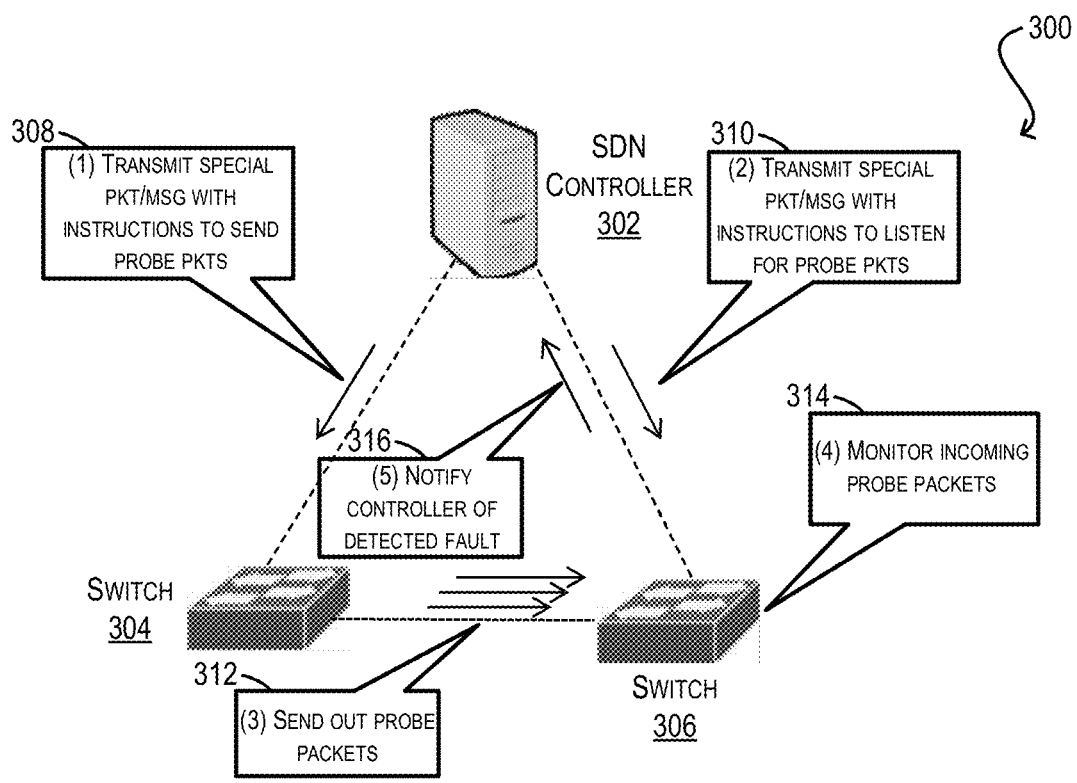
FIG. 3 depicts a workflow for performing active path tracing according to an embodiment.

FIG. 3 depicts a high-level workflow 300 that can be performed by an SDN controller 302 and two network switches 304 and 306 for implementing active path tracing according to an embodiment. SDN controller 302 can be implemented using SDN controller 200 of FIG. 2, and each network switch 304/306 can be implemented using network switch 202 of FIG. 2. Active path tracing enables SDN controller 302 to advantageously offload the transmission and monitoring of probe packets for network fault detection to switches 304 and 306, thereby allowing for greater scalability and potentially faster detection times.

Starting with step (1) of workflow 300 (reference numeral 308), the resiliency application running on SDN controller 302 can transmit a special packet/message to switch 304 instructing the switch to begin sending probe packets to switch 306 for the purpose of monitoring the health of the link between the two switches. In embodiments where SDN controller 302 uses OpenFlow to communicate with switch 304, the special packet/message can be sent in the form of an OpenFlow "Experimenter" (in OpenFlow v. 1.3) or "Vendor" (in OpenFlow v. 1.0) message. In these embodiments, the Experimenter or Vendor message can include a payload that identifies the purpose of the packet/message (i.e., initiate active path tracing), as well as supporting parameters such as path details, probe packet transmission rate, etc. Alternatively, the special packet/message can be sent in the form of an OpenFlow message that has been created and standardized for this specific purpose. In yet other embodiments, SDN controller 302 can use any other southbound protocol to communicate the special packet/message. Note that SDN controller 302 only needs to send this special packet/message once to switch 304 in order to initiate active path tracing.

At step (2) (reference numeral 310), the resiliency application of SDN controller 302 can also transmit a special packet/message to switch 306 instructing the switch to begin listening for the probe packets from switch 304, and to alert controller 302 in case such packets are not received from switch 304 within a predefined timeout period (and/or for a certain number of times). Like the special packet/message sent at step (1), this packet/message can take the form of an OpenFlow Experimenter/Vendor message or a new, standardized OpenFlow message (not yet defined), and only needs to be transmitted to switch 306 once.

At step (3) (reference numeral 312), the SDN protocol helper running on switch 304 can interpret the special packet/message received from SDN controller 302 and can cause switch 304 to begin sending probe packets to switch 306. Generally speaking, the frequency at which the probe packets are sent will determine how quickly faults can be detected, and this frequency can be configured by the resiliency application of SDN controller 302 (via the "probe packet transmission rate" parameter mentioned above). In one embodiment, switch 304 can be configured to send out the probe packets at a rate faster than one per second (which is the typical rate for LLDP fault detection). Since the probe packets are transmitted by switch 304 instead of SDN controller 302, controller 302 does not incur any additional stress or computational load by increasing this frequency value.

Concurrently with step (3), at step (4) (reference numeral 314), the SDN protocol helper running on switch 306 can interpret the special packet/message received from SDN controller 302 and can begin listening for the probe packets sent by switch 304.

Finally, at step (5) (reference numeral 316), if the SDN protocol helper on switch 306 determines that probe packets have not been received from switch 304 within a preconfigured interval (or for a certain number of times), the SDN protocol helper can cause switch 306 to send a single notification message to SDN controller 306 indicating that the path between the two switches has experienced a failure.

With workflow 300 of FIG. 3, a number of advantages can be realized over conventional LLDP fault detection. First, SDN controller 302 only sends a single instruction packet/message to switch 304 and 306 respectively in order to initiate the detection process; switches 304 and 306 then autonomously handle the tasks of sending, and monitoring for, probe packets over the path between the switches. Further, SDN controller 302 only receives a single notification (from switch 306) when a fault has been detected. This is contrast to LLDP fault detection, which requires the controller itself to transmit and monitor for LLDP packets on a continuous basis. Thus, workflow 300 is far more scalable, and can be configured to reduce detection latency (by increasing the probe packet transmission rate at switch 304) without impacting SDN controller 302.

Further, since switch 306 becomes the point-of-detection in workflow 300, this opens up the possibility of performing local repair directly at switch 306, without having to contact SDN controller 302 (described in Section 5 below).

Although not shown in FIG. 3, in certain embodiments, rather than sending special packets/messages to both switches 304 and 306 at steps (1) and (2) of workflow 300 respectively, SDN controller 302 may send such a packet/message to switch 304 only. This packet/message may include instructions to initiate active path tracing on the path to switch 306, as well as a timeout and/or miss count parameter. Switch 304 may then begin sending probe packets to switch 306 over the path and may monitor for reply packets from switch 306 in response to the probe packets. If the SDN protocol helper on switch 304 determines that a reply packet is not received from switch 306 within a time period m (where m corresponds to the timeout parameter) and/or there are n consecutive misses of the reply packet from switch 306 (where n corresponds to the miss count parameter), switch 304 can conclude that the path to switch 306 has been disrupted or has gone down and can send an appropriate notification to SDN controller 302. Thus, in these embodiments, switch 304 can act as both the sender of probe packets along the monitored path and the point-of-detection of network faults for that path.

Figure 4:
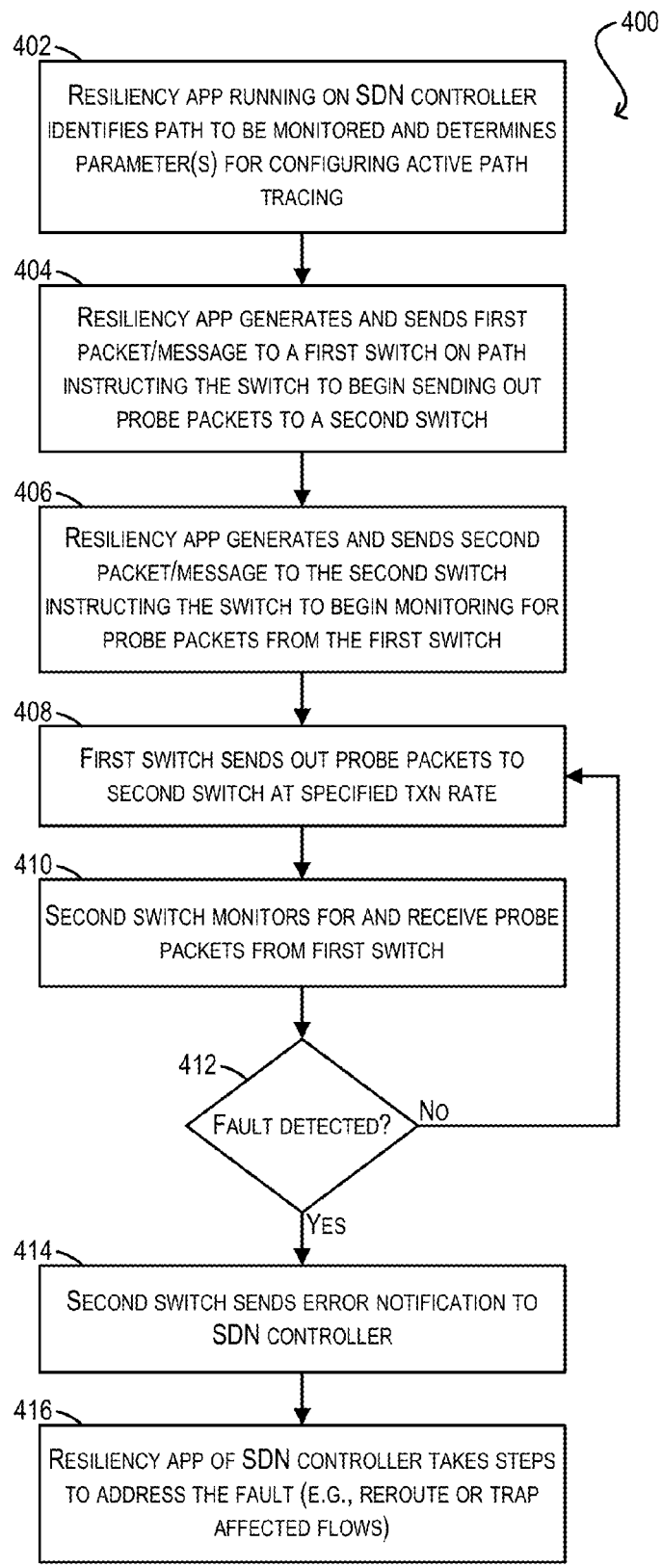
FIG. 4 depicts a flowchart that provides additional details regarding the workflow of FIG. 3 according to an embodiment.

FIG. 4 depicts a flowchart 400 that provides additional details regarding the active path tracing workflow of FIG. 3 according to an embodiment. Starting with block 402, the resiliency application running on an SDN controller (e.g., controller 302 of FIG. 3) can identify a path in a network that should be monitored via active path tracing and can determine one or more parameters for configuring the tracing process. These parameters can include, e.g., the details of the path, a probe packet transmission rate parameter indicating how often probe packets should be sent out along the path, a timeout parameter indicating a time-based threshold for concluding that the path has become nonoperational, a miss count value indicating a packet-based threshold for concluding that the path has become nonoperational, and/or others. In a particular embodiment, the resiliency application may receive desired values for one or more of these parameters from an administrator or user.

At block 404, the resiliency application can generate and send a first special packet/message to a first switch along the path (e.g., switch 304 of FIG. 3) that includes some (or all) of the parameters determined at block 402 and that instructs the first switch to begin sending out probe packets to a second switch along the path (e.g., switch 306 of FIG. 3). For example, in one embodiment, this first special packet/message can include the timer parameter described above so that the first switch knows the frequency at which it should send out the probe packets.

At approximately the same time as block 404, SDN controller 302 can also generate and send a second special packet/message to the second switch along the path that includes some (or all) of the parameters determined at block 402 and that instructs the second switch to begin monitoring for probe packets from the first switch (block 406). In one embodiment, this second special packet/message can include the timeout and/or miss count parameters described above so that the second switch knows how to determine when the path between the first and second switches has gone down.

Then, at blocks 408 and 410, the first switch can send out the probe packets to the second switch at the specified transmission rate, and the second switch can monitor for and receive the probe packets. If, at block 412, the second network switch detects a fault by, e.g., determining that it has not received n consecutive probe packets from the first switch (where n is the miss count parameter described above) or has not received a probe packet for m seconds (where m is the timeout parameter described above), the second switch can send an error notification to the SDN controller (block 414).

Finally, at block 416, the resiliency application on the SDN controller can receive the error notification from the second switch and take one or more steps to address the fault (e.g., reroute or trap the flows along the path).

4. Flow-Specific Fault Detection

Figure 5:
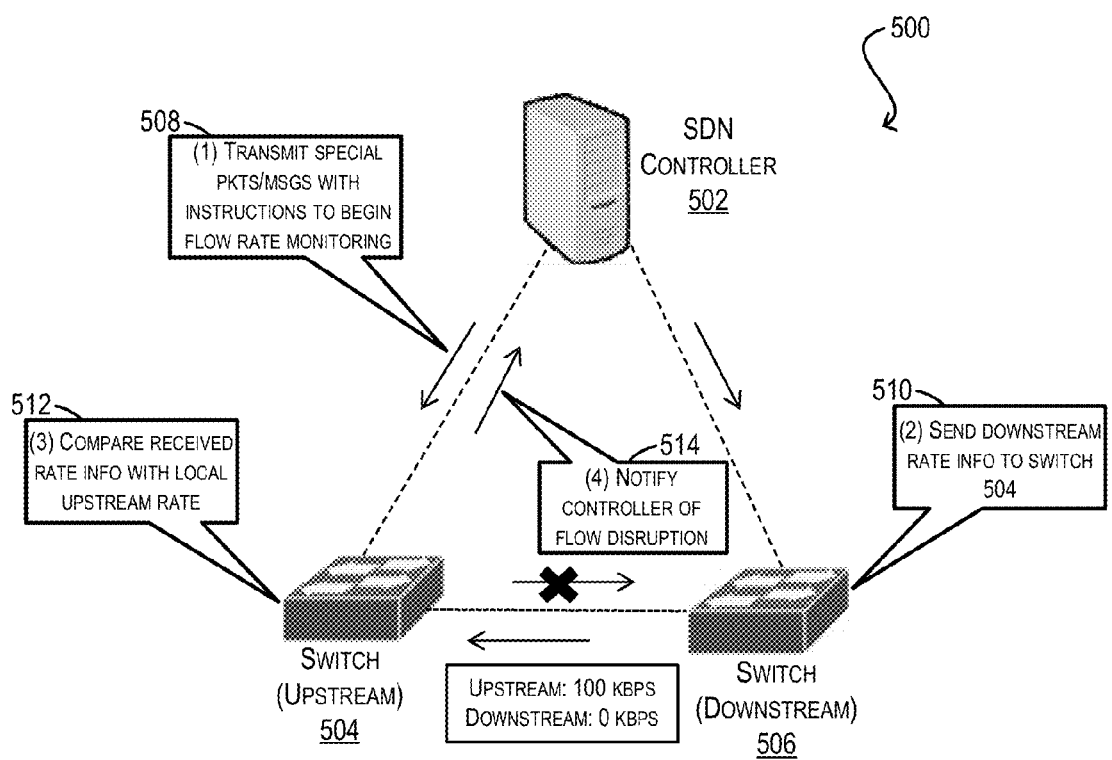
FIG. 5 depicts a workflow for performing flow-specific failure detection according to an embodiment.

In addition to enabling faster fault detection, certain embodiments can also enable the detection of flow-specific failures. FIG. 5 depicts high-level workflow 500 that can be performed by an SDN controller 502 and two network switches 504 and 506 for implementing such a process according to an embodiment. In various embodiments, SDN controller 502 and network switches 504/506 can be implemented using SDN controller 200 and network switch 202 of FIG. 2 respectively.

Starting with step (1) (reference numeral 508), the resiliency application running on SDN controller 502 can determine that a unidirectional flow between switches 504 and 506 should be monitored, and can send out special packets/messages to switches 504 and 506 instructing them to begin flow rate monitoring. In this example, switch 504 is upstream of switch 506 with respect to the flow, and thus switch 504 is considered an upstream device and switch 506 is considered a downstream device. Like the special packets/messages described with respect to workflow 300 of FIG. 3, the packets/messages sent at step (1) of workflow 500 can be OpenFlow Experimenter/Vendor messages or a new, standardized OpenFlow message (not yet defined).

In response to these packets/messages, the SDN protocol helper running on downstream switch 506 can begin sending flow rate information for the flow to upstream switch 504 via special packets (step (2), reference numeral 510). In various embodiments, this flow rate information can reflect the local data rate for the flow as measured at downstream switch 506. Switch 506 can send this flow rate information at a regular interval (e.g., once a second) that may be defined in the special packets/message received from SDN controller 502.

At step (3) (reference numeral 512), the SDN protocol helper running on upstream switch 504 can receive the flow rate information sent by downstream switch 506 and can compare that rate (i.e., the downstream rate) to the local rate determined at upstream switch 504. In this particular example, the downstream flow has been disrupted, and thus the downstream rate is 0 kbps (while the upstream rate is 100 kbps). Upon detecting this discrepancy in rates, the SDN protocol helper can conclude that there has been a flow disruption.

Finally, at step (4) (reference numeral 514), upstream switch 504 can transmit a message to SDN controller 502 identifying the flow failure.

With workflow 500 of FIG. 5, switches 504 and 506 can advantageously detect "soft" failures that affect a network flow, such as a flow congestion at a particular switch, flow mis-programming, or the like. Switch 504 can then communicate this information SDN controller 502 so that controller 502 can take steps to address the problem. This type of soft failure detection is not possible with conventional LLDP, which is only designed to detect failures that affect the physical network topology.

Further, since switch 504 handle the flow failure detection locally, there is no need for external monitors and/or SDN controller 502 to check for traffic loss, thereby significantly reducing the amount of northbound traffic that is needed between switches 504/506 and such monitors and/or controller 502.

Figure 6:
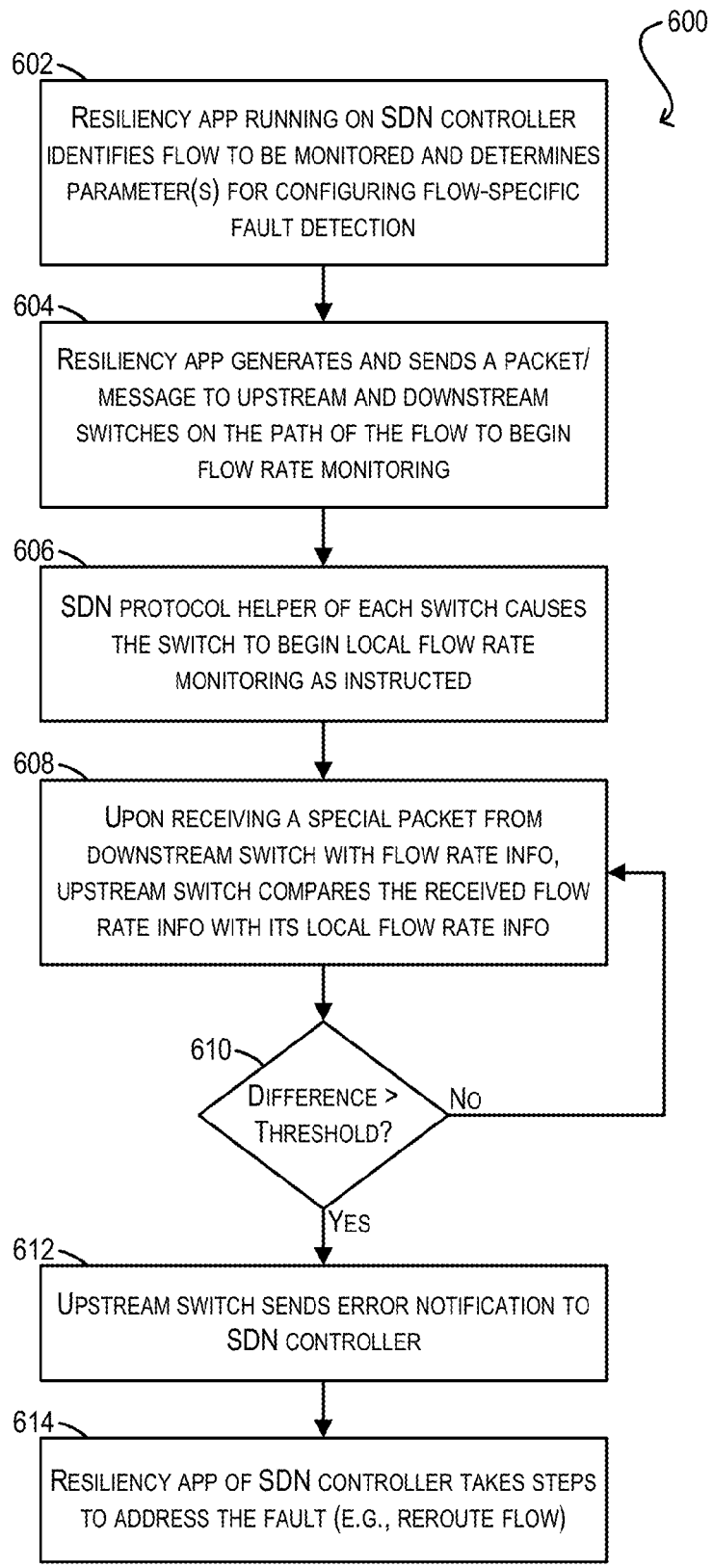
FIG. 6 depicts a flowchart that provides additional details regarding the workflow of FIG. 5 according to an embodiment.

FIG. 6 depicts a flowchart 600 that provides additional details regarding the flow-specific fault detection workflow of FIG. 5 according to an embodiment. Starting with block 602, the resiliency application running on an SDN controller (e.g., controller 502 of FIG. 5) can identify a flow in a network that should be monitored for faults and can determine one or more parameters for configuring the detection process. These parameters can include, e.g., flow details and a threshold parameter indicating a degree of difference in flow rates that would signal a flow disruption. In a particular embodiment, the resiliency application may receive desired values for one or more of these parameters from an administrator or user.

At block 604, the resiliency application can generate and send a special packet/message to each of two switches along the path of the flow (e.g., upstream switch 504 and downstream switch 506 of FIG. 5) that includes some (or all) of the parameters determined at block 602 and that instructs the downstream switch to collect local flow rate information indicating the incoming and/or outgoing data rate(s) for the flow and send out this local flow rate to the upstream switch in the form of special flow rate packets, and instructs the upstream switch to monitor for the special packets from the downstream switch. The SDN protocol helper of each switch can then process these special packets/messages and being local flow rate monitoring as instructed (block 606).

At block 608, upon receiving a special packet from the downstream switch with flow rate information, the upstream switch can compare the received flow rate information with the switch's local flow rate information. For example, the upstream switch can compare the outgoing flow data rate with the incoming flow data rate specified in the packet. Based on this comparison, the upstream switch can check whether the difference in flow data rates exceeds a threshold (as specified by the threshold parameter discussed at block 602) (block 610). If not, the switch can determine that there is no flow disruption and flowchart 600 can cycle back to block 608.

However, if the different in flow data rates does exceed the threshold, the upstream switch can determine that a flow disruption has occurred and can send an error notification to the SDN controller (block 612). The resiliency app of the SDN controller can then take appropriate steps to address the disruption, such as by redirecting the flow (block 614).

It should be appreciated that the workflows and flowcharts of FIGS. 3-6 are illustrative and not intended to limit embodiments of the present disclosure. For example, although only two switches are shown in FIGS. 3 and 5, SDN controller 302/502 can potentially interact with many switches simultaneously using the general concepts outlined in the workflows. Further, in some embodiments, the special/probe packets exchanged between switch 304/504 and switch 306/506 can be tunneled to make their format opaque to any intermediate switches that may not implement the SDN protocol helper described herein. One of ordinary skill in the art will recognize many variations, modifications, and alternatives.

5. Local Repair

As mentioned previously, in certain embodiments the switches shown in FIGS. 3 and 5 can perform a "local repair" upon detecting a topology or flow-specific failure. This is in contrast to conventional repair methods, which require the central SDN controller to be notified of (or detect) the failure, and then provision and push backup path information to the switches to implement the repair. There are existing techniques can perform local repair at an in-band switch, but those existing techniques generally can only react to port down failures (not other topology or flow-specific failures).

To enable local repair in response to a topology or flow-specific failures, the resiliency application running on the SDN controller can pre-provision backup paths and transmit this information to connected switches as part of the special packet/messages described with respect to workflows 300 and 500. In a particular embodiment, this can be facilitated by using the "fast-failover group" functionality available in OpenFlow 1.3. Then, when a given switch detects a topology failure (in the case of workflow 300) or a flow-specific failure (in the case of workflow 500), the switch can automatically failover traffic to the pre-provisional backup path(s) without contacting the SDN controller again.

6. Network Switch

Figure 7:
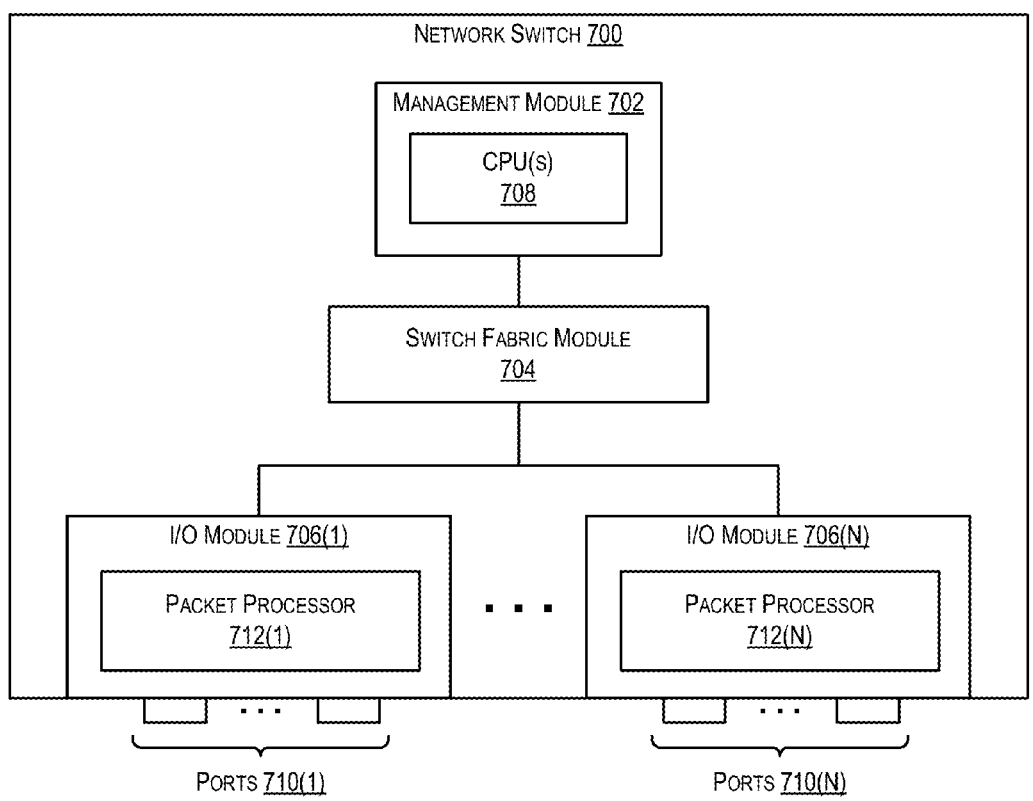
FIG. 7 depicts a network switch according to an embodiment.

FIG. 7 is a simplified block diagram of an example network switch 700 according to an embodiment. Network switch 700 can be used to implement, e.g., switches 202, 304, 306, 504, and 506 of FIGS. 2, 3, and 5 respectively.

As shown, network switch 700 includes a management module 702, a switch fabric module 704, and a number of I/O modules 706(1)-706(N). Management module 702 includes one or more management CPUs 708 for managing/controlling the operation of the device. Each management CPU 708 can be a general purpose processor, such as a PowerPC, Intel, AMD, or ARM-based processor, that operates under the control of software stored in an associated memory (not shown). In one embodiment, management CPU 708 can carry out the operations attributed to SDN protocol helper 212 and SDN protocol agent 206 in the foregoing disclosure.

Switch fabric module 704 and I/O modules 706(1)-706(N) collectively represent the data, or forwarding, plane of network switch 700. Switch fabric module 704 is configured to interconnect the various other modules of network switch 700. Each I/O module 706(1)-706(N) can include one or more input/output ports 710(1)-710(N) that are used by network switch 700 to send and receive data packets. Each I/O module 706(1)-706(N) can also include a packet processor 712(1)-712(N). Packet processor 712(1)-712(N) is a hardware processing component (e.g., an FPGA or ASIC) that can make wire speed decisions on how to handle incoming or outgoing data packets. In a particular embodiment, each packet processor can incorporate the flow tables 208 described with respect to FIG. 2.

It should be appreciated that network switch 700 is illustrative and not intended to limit embodiments of the present invention. Many other configurations having more or fewer components than switch 700 are possible.

7. Computer System

Figure 8:
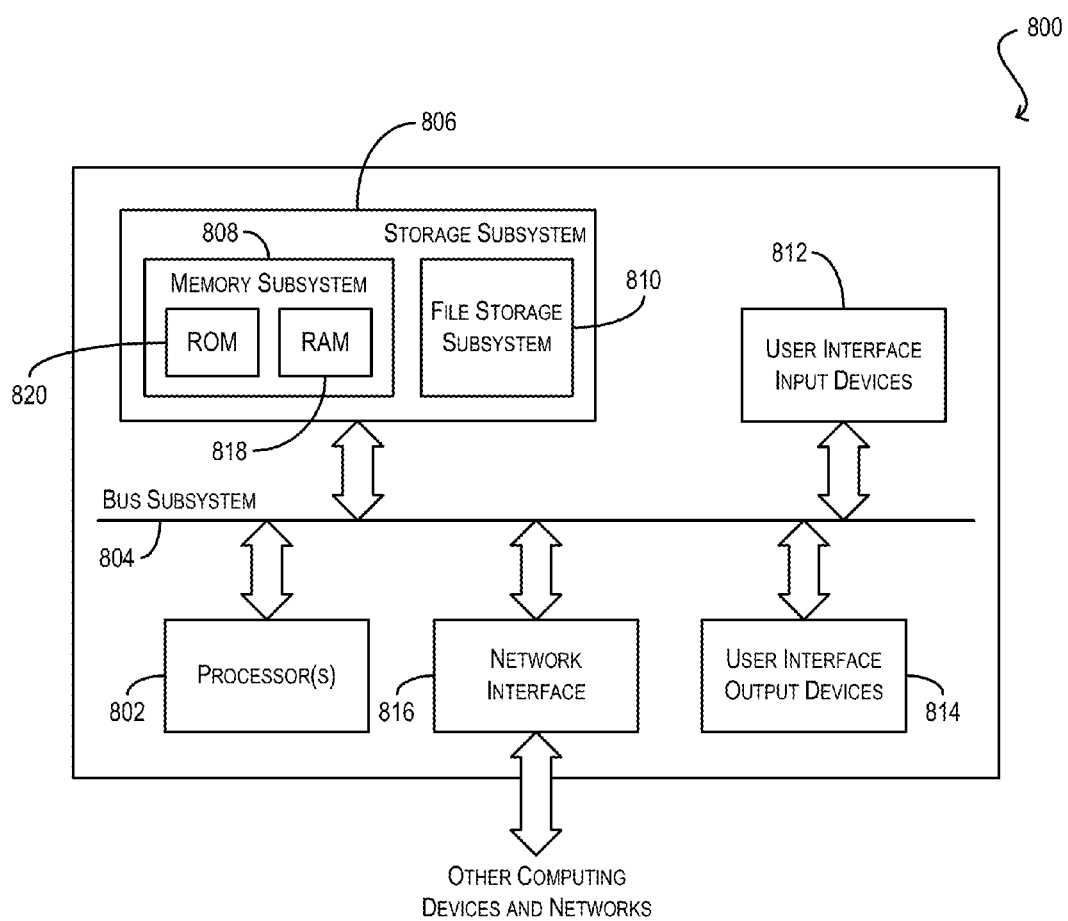
FIG. 8 depicts a computer system according to an embodiment.

FIG. 8 is a simplified block diagram of an example computer system 800 according to an embodiment. Computer system 800 can be used to implement SDN controllers 200, 302, and 502 of FIGS. 2, 3, and 5 respectively. As shown in FIG. 8, computer system 800 can include one or more processors 802 that communicate with a number of peripheral devices via a bus subsystem 804. These peripheral devices can include a storage subsystem 806 (comprising a memory subsystem 808 and a file storage subsystem 810), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computing devices or networks. Embodiments of network interface subsystem 816 can include wired (e.g., coaxial, twisted pair, or fiber optic Ethernet) and/or wireless (e.g., Wi-Fi, cellular, Bluetooth, etc.) interfaces.

User interface input devices 812 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 800.

User interface output devices 814 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 800.

Storage subsystem 806 can include a memory subsystem 808 and a file/disk storage subsystem 810. Subsystems 808 and 810 represent non-transitory computer-readable storage media that can store program code and/or data that provide the functionality of various embodiments described herein.

Memory subsystem 808 can include a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and not intended to limit embodiments of the present invention. Many other configurations having more or fewer components than computer system 800 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described in the context of SDN networks, the techniques described herein may also be used to increase resiliency and improve fault detection in other types of networks that may include a controller-like device and data forwarding devices (e.g., Ethernet or SAN fabrics, etc.). Further, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   receiving, by a Software Defined Networking (SDN) application running on an SDN controller, one or more user-defined parameters for configuring fault detection on a path between first and second network devices, the one or more user-defined parameters including a first parameter indicating how often probe packets should be sent out along the path and a second parameter indicating a threshold for determining when the path has become nonoperational;
   transmitting, by the SDN application, a first message to the first network device, the first message instructing the first network device to begin sending probe packets to the second network device at a rate determined by the first parameter; and
   transmitting, by the SDN application, a second message to the second network device, the second message instructing the second network device to monitor for the probe packets sent by the first network device and to notify the SDN application when the threshold indicated in the second parameter is exceeded.

2. The method of claim 1 further comprising:
   receiving, by the SDN application from the second network device, a notification indicating that the threshold has been exceeded; and
   determining, based on the notification, that a port, link, or node failure has occurred between the first and second network devices.

3. The method of claim 2 further comprising:
   rerouting, by the SDN application, one or more flows affected by the failure along an alternative path.

4. The method of claim 2 wherein, subsequently to sending out the notification, the second network device is operable to reroute one or more flows affected by the failure along an alternative path.

5. The method of claim 1 wherein the threshold corresponds to a number of consecutive probe packets that may be missed from the first network device.

6. The method of claim 1 wherein the first network device and the second network device are network switches.

7. The method of claim 1 wherein the SDN controller communicates with the first network device and the second network device using a southbound SDN protocol.

8. The method of claim 1 wherein the first message and the second message are OpenFlow Experimenter or Vendor messages.

9. The method of claim 1 wherein the rate is greater than one probe packet per second.

10. A non-transitory computer readable storage medium having stored thereon program code executable by a Software Defined Networking (SDN) controller, the program code causing the SDN controller to:
    receive, via an SDN application running on the SDN controller, one or more user-defined parameters for configuring fault detection on a path between first and second network devices, the one or more user-defined parameters including a first parameter indicating how often probe packets should be sent out along the path and a second parameter indicating a threshold for determining when the path has become nonoperational;
    transmit a first message to the first network device, the first message instructing the first network device to begin sending probe packets to the second network device at a rate determined by the first parameter; and
    transmit a second message to the second network device, the second message instructing the second network device to monitor for the probe packets sent by the first network device and to notify the SDN application when the threshold indicated in the second parameter is exceeded.

11. The non-transitory computer readable storage medium of claim 10 wherein the program code further causes the SDN controller to:
    receive, from the second network device, a notification indicating that the threshold has been exceeded; and
    determine, based on the notification, that a port, link, or node failure has occurred between the first and second network devices.

12. A computer system comprising:
    a processor; and
    a non-transitory computer readable medium having stored thereon program code that, when executed by the processor, causes the processor to:

receive, via a Software Defined Networking (SDN) application running on the processor, one or more user-defined parameters for configuring fault detection on a path between first and second network devices, the one or more user-defined parameters including a first parameter indicating how often probe packets should be sent out along the path and a second parameter indicating a threshold for determining when the path has become nonoperational;

transmit a first message to the first network device, the first message instructing the first network device to begin sending probe packets to the second network device at a rate determined by the first parameter; and transmit a second message to the second network device, the second message instructing the second network device to monitor for the probe packets sent by the first network device and to notify the SDN application when the threshold indicated in the second parameter is exceeded.

13. The computer system of claim 12 wherein the program code further causes the processor to:

receive, from the second network device, a notification indicating that the threshold has been exceeded; and determine, based on the notification, that a port, link, or node failure has occurred between the first and second network devices.

14. A method comprising:

receiving, by a network device, a message from a Software Defined Networking (SDN) controller, the message instructing the network device to monitor for probe packets sent by another network device and including a threshold pertaining to receipt of the probe packets;

determining, by the network device, that the threshold has been exceeded; and in response to the determining:
  notifying the SDN controller that the threshold has been exceeded; and
  automatically redirecting traffic between the network device and said another network device along one or more backup paths pre-provisioned by the SDN controller.

15. The method of claim 14 wherein the message is an SDN protocol message, and wherein the receiving comprises parsing the SDN protocol message using an SDN protocol agent of the network device.

16. The method of claim 14 wherein the message includes information regarding the one or more backup paths.

17. The method of claim 14 wherein the threshold is a packet-based threshold indicating an allowable number of consecutive probe packets that may be missed from said another network device.

18. The method of claim 14 wherein the threshold is a time-based threshold indicating an allowable amount of time between receipt of consecutive probe packets from said another network device.

19. A non-transitory computer readable storage medium having stored thereon program code executable by a network device, the program code causing the network device to:

receive a message from a Software Defined Networking (SDN) controller, the message instructing the network device to monitor for probe packets sent by another network device and including a threshold pertaining to receipt of the probe packets;

determine that the threshold has been exceeded; and in response to the determining:
  notify the SDN controller that the threshold has been exceeded; and
  automatically redirect traffic between the network device and said another network device along one or more backup paths pre-provisioned by the SDN controller.

20. A network device comprising:

a processor; and a non-transitory computer readable medium having stored thereon program code that, when executed by the processor, causes the processor to:

receive a message from a Software Defined Networking (SDN) controller, the message instructing the network device to monitor for probe packets sent by another network device and including a threshold pertaining to receipt of the probe packets;

determine that the threshold has been exceeded; and in response to the determining:
  notify the SDN controller that the threshold has been exceeded; and
  automatically redirect traffic between the network device and said another network device along one or more backup paths pre-provisioned by the SDN controller.

* * * * *